G. E. D. RALLS.
SPRING MOUNTING FOR MOTOR AND OTHER VEHICLES.
APPLICATION FILED JAN. 5, 1917.

1,319,967.

Patented Oct. 28, 1919.
3 SHEETS—SHEET 3.

UNITED STATES PATENT OFFICE.

GEORGE EDWARD DURSTON RALLS, OF BIRMINGHAM, ENGLAND, ASSIGNOR OF ONE-HALF TO THE BIRMINGHAM AND MIDLAND COUNTIES TRANSPORT COMPANY, LIMITED, OF BIRMINGHAM, ENGLAND.

SPRING-MOUNTING FOR MOTOR AND OTHER VEHICLES.

1,319,967.   Specification of Letters Patent.   Patented Oct. 28, 1919.

Application filed January 5, 1917. Serial No. 140,809.

*To all whom it may concern:*

Be it known that I, GEORGE EDWARD DURSTON RALLS, a subject of the Kingdom of Great Britain, residing at 314 Bradford street, Birmingham, in the county of Warwick, England, have invented certain new and useful Improvements in or Relating to Spring-Mountings for Motor and other Vehicles, of which the following is a specification.

This invention relates to spring mountings for motor and other vehicles, of the type in which the wheels which are coupled to the chassis by spring suspension means of any suitable or approved form, are furnished with rods or members disposed one on each side of the vehicle, said rods or members being separate from each other and extending longitudinally of the chassis, and being coupled to the latter, by means which permit of a longitudinal movement of such rods or members against the resistance of suitable resilient media. According to the present invention, the provision for permitting of movement of the said rods or members against the resistance of the resilient media is of such a character that the said rods or members are constrained in such movement to operate in unison, that is to say, the said movement of the rod or member on one side of the vehicle cannot exceed that of the rod or member on the other side of the vehicle. Advantageously this object is obtained by providing in connection with the provision permitting of movement of the said rods or members in relation to the chassis, a transverse rotary element coöperating at its respective ends with the separate mechanisms permitting of movement of the respective rods or members so that the said mechanisms are thereby constrained to operate in unison.

Conveniently, in addition to the said rods or members, I employ a torque bar disposed longitudinally and centrally in the width of the car, this torque bar being coupled at its rear extremity to the casing of the differential gear pertaining to the rear axles, and being coupled at its fore extremity to a part pertaining to the chassis. A ball-and-socket joint may be provided between the fore part of the torque bar and the part with which it coöperates, and at its rear extremity the said torque bar may be pivotally connected to the differential gear casing, the axis of the pivotal connection being disposed vertically. The side rods or members heretofore mentioned may be coupled at their rear extremities to the wheel axles, and at their fore extremities by ball-and-socket joints with the depending arms of vertically disposed rocking levers, the other or upwardly projecting arms of which rocking levers are adapted to operate in relation to suitably incorporated springs.

In order that this invention may be clearly understood and readily carried into practice, reference may be had to the appended explanatory three sheets of drawings, upon which:—

Fig. 4 is a detail sectional view taken on the plane indicated by the line 4—4 of Fig. 2 and showing the connection between the bar *e* and the chassis.

Figure 1:
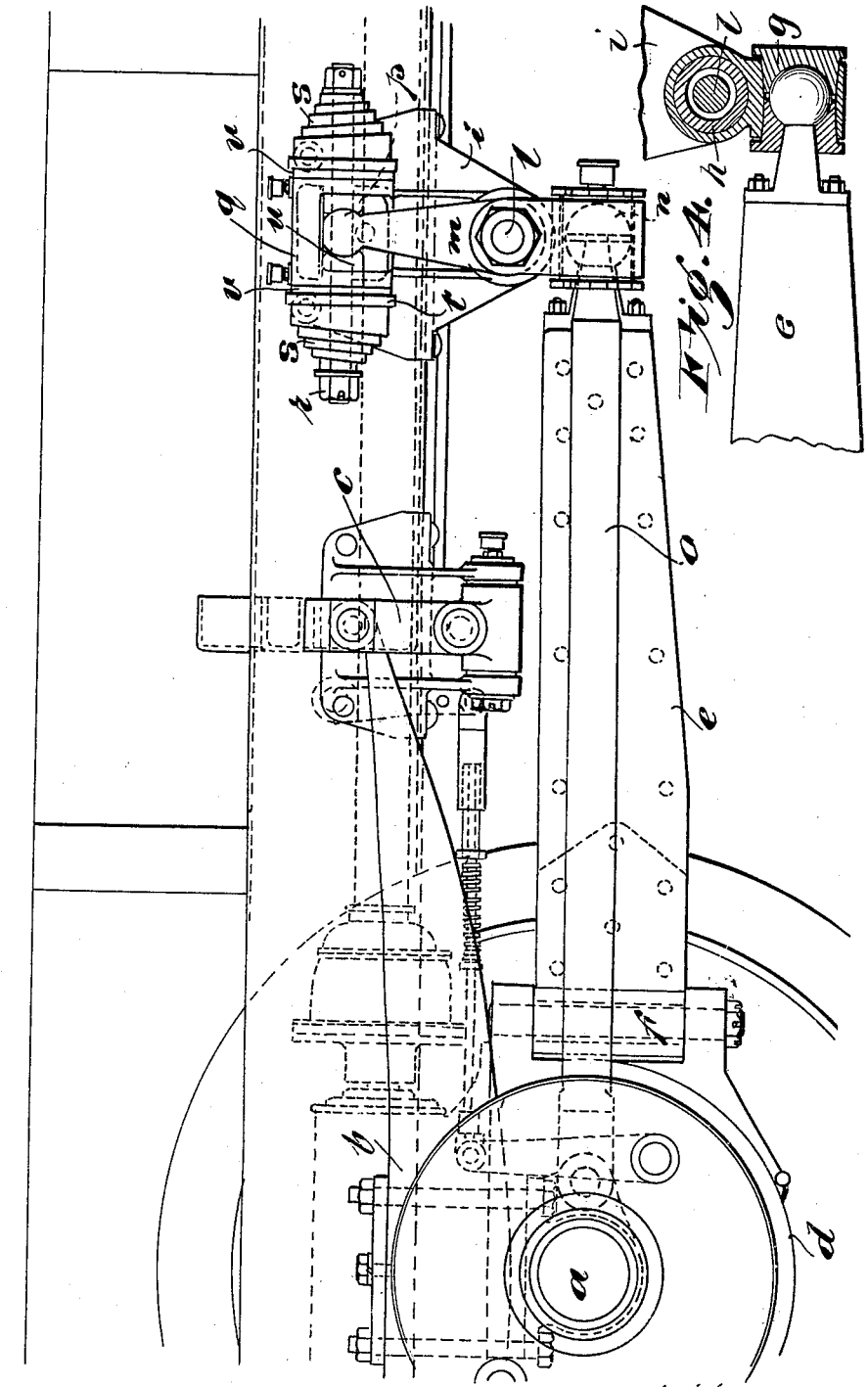
Figure 1 is a part side elevation of a motor road vehicle having the present improvements applied thereto.
Figure 2:
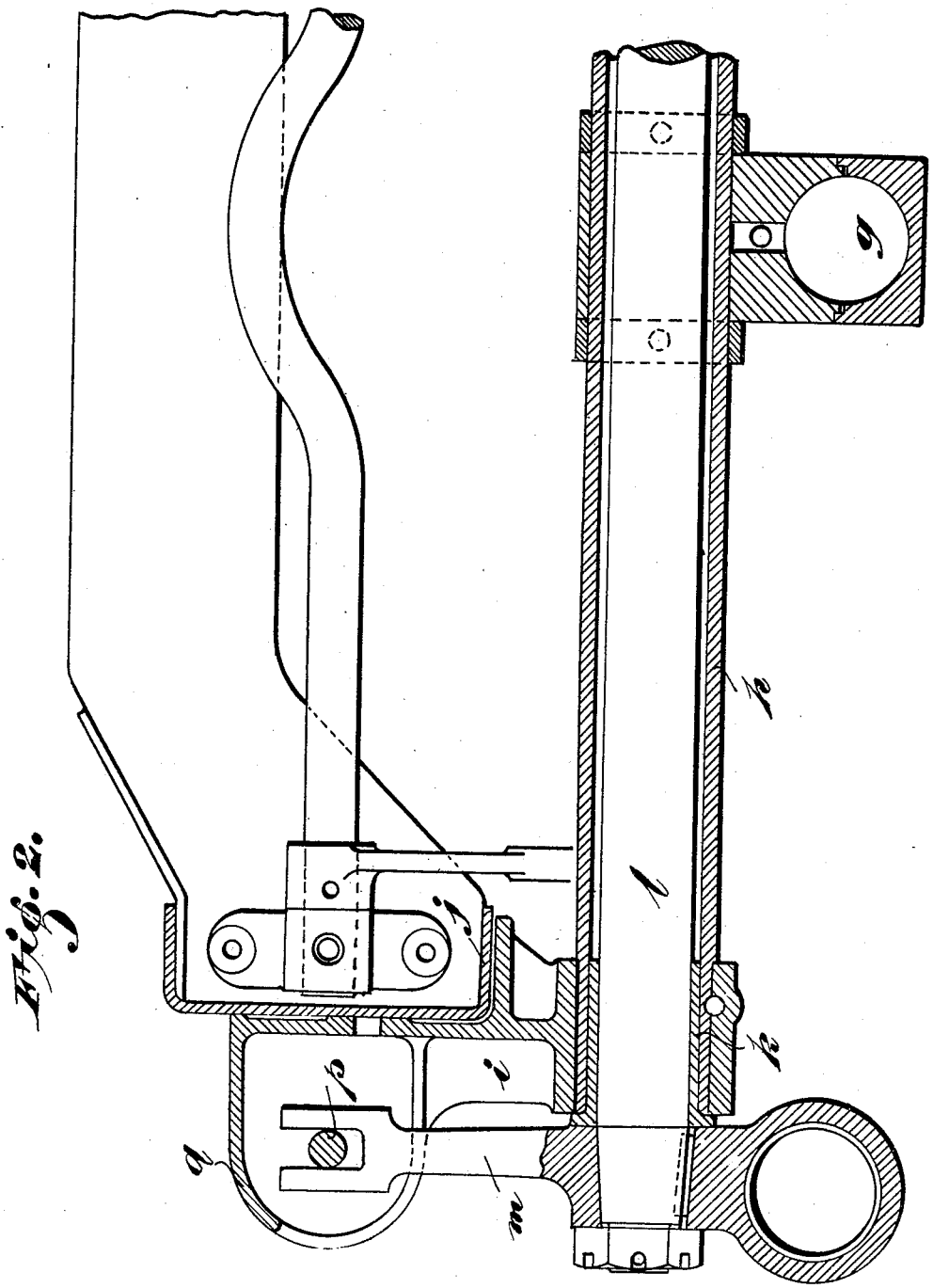
Fig. 2 is a partial sectional end elevation on a larger scale, of the vehicle shown in Fig. 1.
Figure 3:
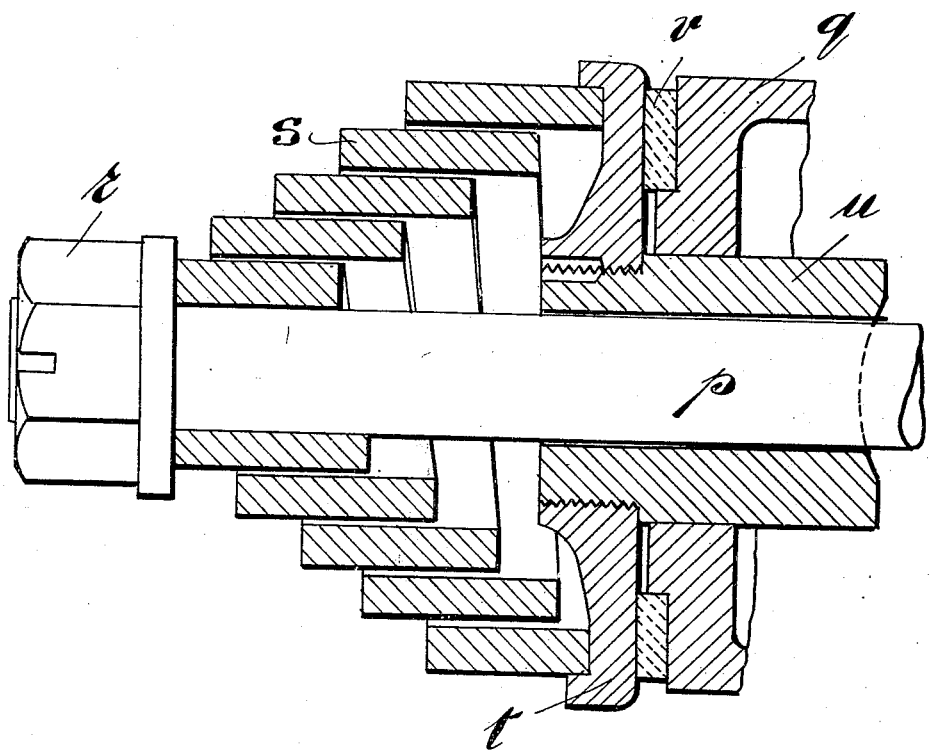
Fig. 3 is a sectional side elevation of part of the mechanism shown in Fig. 1.

In the drawings, *a* represents the rear axle, which at or near its extremities is suitable coupled to the chassis by springs *b*; these springs *b* may at their extremities be connected to the chassis through mechanism *c* providing for a universal movement. *d* is the casing of the differential to which the torque bar *e* is pivotally connected at *f*, the axis of pivotal connection being, as shown, disposed vertically. *g*, Fig. 2, is the socket of the ball-and-socket joint between the torque bar *e* and a part of or pertaining to the frame. This socket *g* is oscillatorily carried by a sleeve *h* which at its extremities is rigidly mounted in brackets *i* suitably secured rigidly to the chassis *j*. The socket *g* is adapted to rotate about the axis of the sleeve *h* to provide for the forward and rearward movement of the rear axle or axles. Within the sleeve *h* at each end a bearing bush *k* is incorporated, adapted to form a bearing for a transverse shaft *l*. This transverse shaft *l* has keyed to it at each extremity a vertically disposed lever *m*. At its lower extremity each lever *m* incorporates a socket adapted to accommodate a ball *n* provided on the fore extremity of a radius rod *o*, the radius rods *o* being disposed one on each side of the car and being coupled at their rear extremities to the rear wheel axles or parts appertaning thereto. In the arrangement shown in the drawings, the radius rods *o* are hingedly coupled to the rear wheel axles or parts pertaining thereto, the axes of the hinged connections being disposed horizontally. Alternatively, the connection between the radius rods *o* and the axles or parts pertaining thereto may be of a universal character and may consist for instance of a ball-and-socket joint.

Each lever *m* is at its upper extremity bifurcated to accommodate a rod *p* adapted to slide or move longitudinally in a hollow boss-like part *q* of the bracket *i*. Both extremities of the rod *p* pass axially out of the hollow boss-like part *q* and carry at their extreme ends nuts *r*, in relation to which the minor extremities of spiral springs *s* operate. The major extremities of each spring *s* operate in relation to a plate or cup *t* which is provided upon a sleeve *u* encircling the rod *p*, one of these sleeves *u* being disposed on each side of the bifurcated upper extremity of the lever *m*, so that the springs *s*, *s* are thereby enabled through the medium of the rod *p* and members *t*, *u* to control the rocking movement of the member *m*. It will be noted that in whichever direction the lever *m* rocks, the tendency is to compress both of the springs *s*. Fiber or rubber washers or buffers *v* may if desired be provided between the faces of the boss-like part *q* and the rear faces of the plates or cups *t*. Each member *m* controls the longitudinal movement of the radius rods *o*, which in turn control the forward and rearward movement of each rear wheel so that in travel the rear wheels are enabled to move bodily forwardly, and rearwardly, this action being controlled by the springs *s*, *s*.

What I claim as my invention and desire to secure by Letters Patent is:—

A shock absorber for motor vehicles including a chassis, wheels, axles for said wheels, radius rods separated from each other, coupled at one of their extremities to the wheel axle, their other extremities being secured to rocking levers and a common transverse rocking bar to which the rocking levers are secured.

In testimony whereof I affix my signature in presence of two witnesses.

GEORGE EDWARD DURSTON RALLS.

Witnesses:
 ARTHUR H. BROWN,
 HOLLIS F. BROWN.

Copies of this patent may be obtained for five cents each, by addressing the "Commissioner of Patents, Washington, D. C."